Patented July 8, 1941

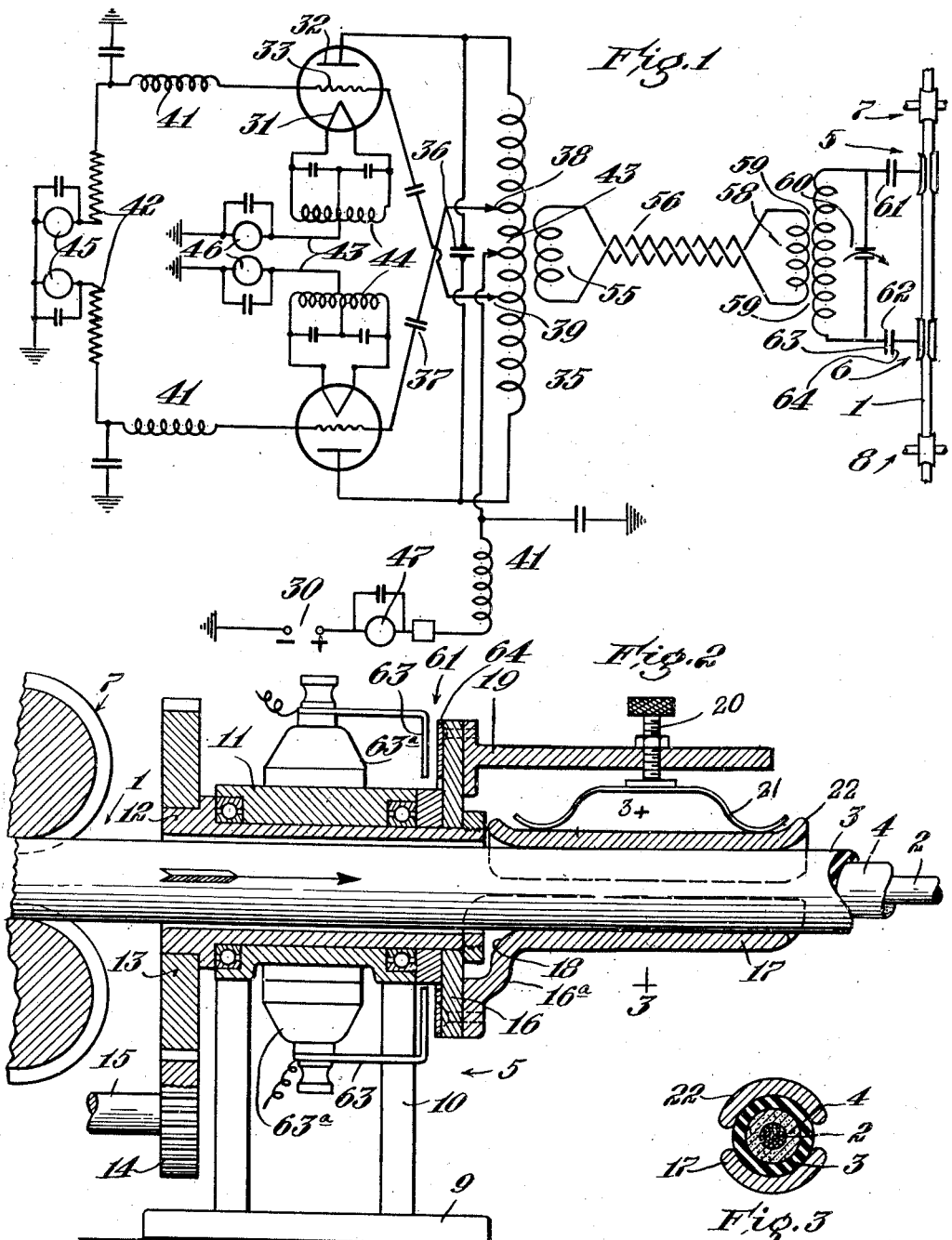

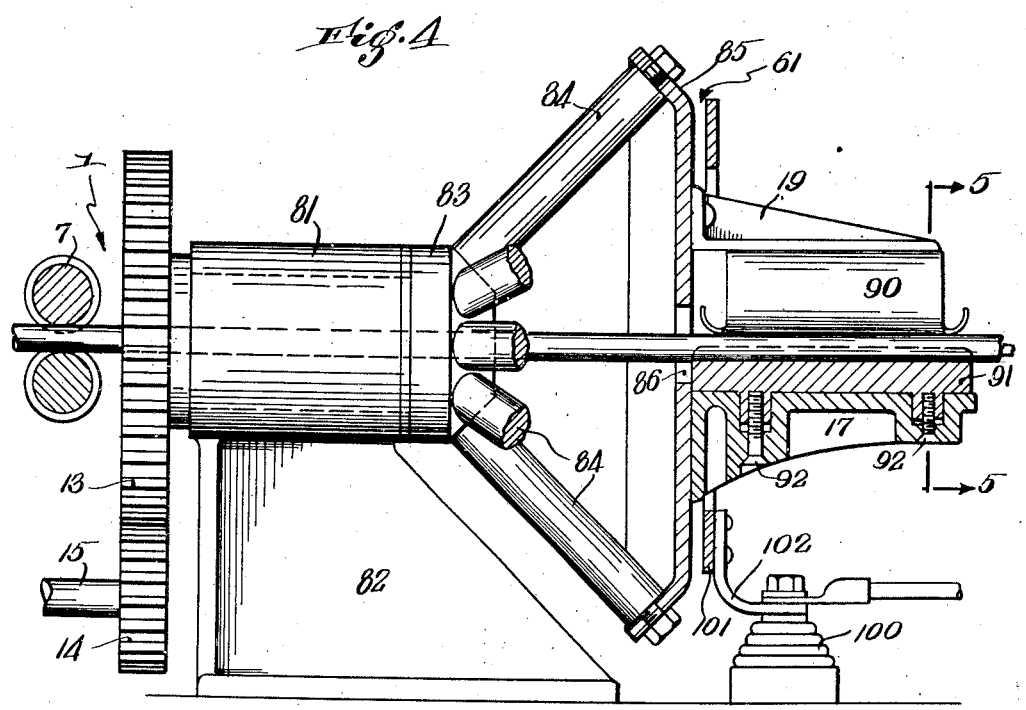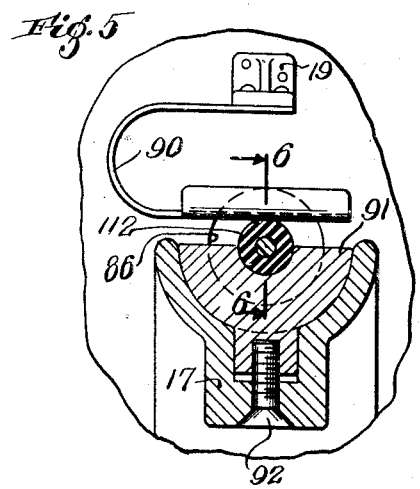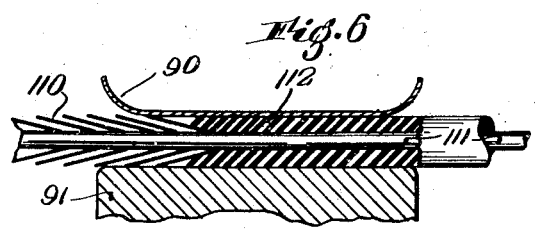

2,248,840

UNITED STATES PATENT OFFICE 2,248,840

APPARATUS FOR AND METHOD OF TREATING STRAND MATERIAL

Howard M. Wilkoff, Worcester, Mass.

Application December 22, 1939, Serial No. 310,661

11 Claims. (Cl. 173—244)

This invention pertains to apparatus for and to a method of treating strand-like material, that is to say, material such as cord, rope, wire (in particular insulated switchboard or building wire), cable, tubular hose, or the like, generally characterized by transverse flexibility and in that length is the predominant dimension—such material usually being capable of production in uninterrupted length of great extent, and the invention relates more particularly to the integration of constituent layers of such strand-like material by the use of heat and pressure.

Strand-like material of certain usual types comprises concentric layers or sheaths of the same or different substances—sometimes, as in the case of electrical conductors, enveloping a metal core or cores, and such enveloping layers or sheaths, or some of them, may be united or integrated by an adhesive, waterproofing or dielectric substance quite commonly of a thermoplastic nature. In the manufacture of electric cables, for example, one or more metal wire cores may be employed with layer upon layer of insulating, waterproofing or armouring material, for instance textile webbing, asbestos, Cellophane, or the like, and such several layers may be united by thermoplastic or thermosetting substances, for example asphalt, plasticized synthetic resin, or the like, which become adhesive when heated but which thereafter set and become tenaciously adhesive, hard, elastic and waterproof.

In the manufacture of such multiple layer strand material it has been common at one or more stages of the building-up operation to subject the material, usually in coiled form, to heat, for instance in an oven, thereby to cause the thermoplastic or thermosetting layer or layers to become adhesive so as to unite, penetrate, and/or integrate the layers of material between which the thermoplastic or thermosetting substance is placed. However, since most of the materials used in making such an insulating covering are insulators of heat as well as of electricity, the application of sufficient heat externally of the material, particularly when coiled, requires the expenditure of much heat energy and involves a great waste of time, and in many cases may require the application of such a high temperature and time as to have a destructive effect upon some of the constituent materials employed. Moreover, when the strand material is coiled while being heat treated, in particular when, as in some electrical conductors, a plurality of core wires or groups of wires are used, such treatment in coil form may fail to produce a uniform adhesion and integration of the layers.

Objects of the present invention are to provide an improved apparatus for, and a method of, applying heat to such strand-like material in an effective and efficient manner, whereby the thermoplastic or thermosetting material included within the strand material may be quickly and uniformly heated to the adhesive temperature regardless of the thickness or number of layers of heat insulation; to provide a novel apparatus for and method of heating the thermoplastic or thermosetting ingredient without necessity of reeling the material into a coil as a preliminary to the heating operation; to provide a novel apparatus and method of heat-treating such strand material whereby the desired temperature at the location of any individual layer of thermoplastic or thermosetting material may be attained without danger of damage to other of the materials included in the strand; and to provide apparatus for and a method of treating such strand material whereby adequate pressure may be exerted radially of the strand while the thermoplastic substance is in its adhesive state, and to ensure uniformity of adhesion, impregnation and/or integration of the several layers constituting the strand.

Other objects and advantages of the invention will be pointed out hereinafter in the following more detailed description and by reference to the accompanying drawings, wherein Fig. 1 is a diagram, in plan, illustrating apparatus of novel character useful in performing the method of the present invention;

Fig. 2 is a fragmentary vertical section showing details of one form of the strand-treating apparatus;

Fig. 3 is a section on the line 3—3 of Fig. 2;

Fig. 4 is an elevation, partly in vertical section, corresponding to Fig. 2, of another embodiment of the invention;

Fig. 5 is a section on line 5—5 of Fig. 4;

Fig. 6 is a section on line 6—6 of Fig. 5; and

Fig. 7 is a view of a conductor made according to the invention.

Referring to the drawings, the numeral 1 indicates a length of strand-like material, for example, an electrical conductor including the metallic wire core 2, an outer sheath 3, and an inner insulating layer 4 which includes a thermoplastic dielectric substance capable of being made adhesive by the application of heat. The layers 3 and 4 may be regarded as broadly exemplifying any of the usual insulating sheathing layers employed in the manufacture of strand-like material such as above referred to, it being understood that there may be several concentric layers, such as the layer 4, consisting of or including the thermoplastic medium and that such several layers may be separated by layers of other materials, and it will further be understood that the layer 3 is representative of any non-metallic sheathing material such as is commonly employed in or which forms a constituent element of strand-like material of the types mentioned.

In accordance with the present invention, this strand-like material is treated for the purpose of rendering adhesive the thermoplastic substance in the layer or layers 4 and to cause such substance uniformly to penetrate or to unite the layers with which it contacts or between which it is interposed. As here illustrated, the apparatus comprises two substantially identical treating devices 5 and 6 (Fig. 1) spaced a substantial distance apart longitudinally of the strand-like material and which act successively upon the material as the latter is drawn through the two devices by means of suitable power-driven conventional capstans and guided by sets of feed rolls 7 and 8.

Referring to Figs. 2 and 3, wherein one of the treating devices, for example the device 5, is shown in detail, the numeral 9 designates a suitable base upon which the device is mounted, such base carrying the insulating uprights 10 which support a bearing 11 in which turns a sleeve 12. To one end of this sleeve is secured a gear 13 which meshes with a pinion 14 on a power-driven shaft 15. To the other end of the sleeve 12 is secured a plate 16 from which projects a bracket 16ª having an elongate, concavely curved portion 17 whose inner surface constitutes a presser element and which is designed to engage the periphery of the strand 1. The plate 16 also supports a bracket 19 having a screw-threaded opening for the reception of an adjusting screw 20 against which bears the middle portion of a leaf spring 21. The ends of this spring rest on presser plate 22 having a concave inner surface which bears against the periphery of the strand material 1, the plates 17 and 22 collectively defining the passage through which the strand material is drawn by the action of the capstan, it being noted that the presser plate 22 is resiliently urged toward the strand material by the spring 21 so that the plates 17 and 22 act to compress the strand material in a substantially radial direction.

Since the sleeve 12 with the plate 16 and the brackets 16ª and 19 is constantly rotated by means of the shaft 15 and the pinion and gear, the presser plates 17 and 22 are caused to revolve bodily about the axis of the strand as the latter is drawn longitudinally through the passage defined by the plates. Thus the pressure exerted by the plates is shifted from point to point about the periphery of the strand material as the operation proceeds.

In order to heat treat the strand material during this pressing operation, and in particular to render adhesive the thermoplastic layer 4, the pressure plates 17 and 22 may be made to constitute condenser elements supplied with energy from a source of high frequency electrical current so that the article treated, including the thermoplastic or thermosetting dielectric layer 4, is subjected to the effects of a high frequency field whereby the various portions become heated, depending on the dielectric constant of their material, so that the thermoplastic or thermosetting layer can be heated to the desired degree by suitably selecting the high frequency energy supplied thereto.

Any suitable apparatus for generating such a high frequency field may be employed, but a desirable form of apparatus is diagrammatically shown by way of illustration in Fig. 1, such apparatus comprising two electron discharge tubes, for example, of the type "RCA 852" having cathodes 31, anodes 32 and control electrodes 33. The tubes have their anodes 32 connected to the opposite ends respectively of a tank coil 35 and to a condenser 36 of about 25 μμfd. constituting a tuned circuit. The control electrodes 33 are, on the one side, crosswise connected through grid condensers 37 of about 0.00025 μfd. to suitable taps 38, 39 of coil 35 and, on the other side, through radio frequency coils 41 and grid leak resistances 42 to the negative pole of a source 30 of direct current of about 3,000 volts, whose other pole is connected to the midpoint 43 of coil 35. The cathodes 31 are connected to the negative pole at 43 and supplied with heating current through filament transformers 44. Suitable milliampere meters may be inserted at 45, 46 and 47.

A secondary 55 receives, from the tuned circuit, high frequency current, in the present instance of about 20,000,000 cycles, which is conducted through a suitable high frequency cable 56 to the strand-treating apparatus. At or near this apparatus is arranged a resonant circuit consisting of primary 58 connected to cable 56, secondary 59 and variable condenser 60. In the preferred embodiment herein described two auxiliary condensers 61, 62 are connected to the resonant circuit. Each of these condensers has a fixed plate 63 mounted upon an insulator 63ª fixed to the bearing 11, and a rotating plate 64 which is fixed to part 16 and which is electrically connected to the presser members 17 and 22, as also indicated in Fig. 2.

Since the capacity constituted by devices 3 and 6 and the cable as dielectric varies as the cable moves through the apparatus, the condenser 60 is adjusted until the resonance point is reached for the prevailing condition. This can be done manually or automatically, for example, by the use of a suitable relay and motor.

Figs. 4, 5 and 6 show another embodiment of the invention which is especially desirable if the diameter of the strand material to be treated changes frequently; this construction is also efficacious for preventing high frequency energy from reaching the bearing and the rotating mechanism where it might cause undesirable heating.

In these figures, 81 is a conventional bearing mounted on a base 82. Journaled within the bearing 81 is a rotary sleeve similar to the sleeve 12 above described and which supports the rotating pressure-applying means. This sleeve is rotated by gearing 13, 14 in the same way as the sleeve 12, and carries a disk on which are mounted a number of stand-off insulators 84 which support an annular disk 85 with a central opening 86 for the passage of the cable. Mounted on disk 85 are bracket members 17 and 19 (similar to the elements denoted with these numerals in Fig. 2), the bracket 19 carrying a leaf spring 90 of U-shape (Fig. 5). Bracket 17 carries a presser element or shoe 91 fastened thereto with screws 92.

Shoes 91 of different sizes may be provided and one may be substituted for another so that the machine may be quickly adapted for the consecutive treatment of material of varying dimensions; also, such shoes are comparatively simple and inexpensive and can therefore be made at short notice for orders specifying unusual diameters. The leaf spring 90 itself is quite satisfactory as a second shoe, corresponding in function to the shoe 22 of Fig. 2. For best results, it appears that the strand contacting surface of the spring 90 should be approximately six inches long (longitudinally of the strand), though the length may be varied within substantial limits. However, if it be increased much beyond six inches, it may be desirable to provide a second bearing, similar to bearing 81, for supporting the right-hand end (Fig. 4) of the spring.

Mounted on an insulator 100 by means of bracket 102 (Fig. 4) is an annular plate 101. This plate is connected to the high frequency circuit and it will be evident that plates 85 and 101 correspond to condenser plates 63 and 64 of Figs. 1 and 2.

The present invention is especially useful in the manufacture of electric conduits used for interior wiring and insulated with synthetic resins in accordance with a procedure about to be explained.

At present, such wire is produced with extruding or tubing machines. The thermoplastic extrudable synthetic resin is fed into a worm-type extruding machine (commonly called a tuber), the wire is passed through suitable male and female dies, and the resin is forced under pressure around the wire between the male and female dies. This procedure is designed to provide a concentric impervious tube of thermoplastic synthetic resin around the wire. In accordance with the present invention it is practicable to provide such an impervious covering of resin by wrapping the thermoplastic synthetic resin tapes around the conductor on any suitable taping machine such as commonly employed in the industry. Subsequent to this taping operation the wire so helically wrapped is drawn through apparatus hereinabove described. The pressure exerted by the rotating devices and the heat generated in the thermoplastic resin tapes while being drawn through the apparatus causes the helical convolutions of tape to become fluent and sticky and to coalesce into a homogeneous mass concentric with the conductor, providing a product which can now only be produced by the exercise of care by the above-mentioned tubing process. The covering of building wire in accordance with the present invention presents several advantages as compared with the old procedure.

When operating a tubing machine, utilizing thermoplastic resins for the insulation, the temperature of the machine and method of control is quite delicate and important. In my process the temperature of the synthetic resin may be automatically controlled by adequate relays in the high frequency generating equipment. In a tubing process the changing of colors of a synthetic resin compound, for example from black to white, necessitates a very thorough cleaning of dies, worms, and all component parts of the tubing equipment. Such cleaning requires considerable time and labor and wastes material. In my process a change of color may be immediately effected by simply changing the package of tape on the taping machine.

Further, in the conventional tubing process it is usually necessary to rely upon the skill and ability of the operator correctly to adjust the relative positions of the male and female dies of the machine to ensure correct centering of the metallic core in the insulating material and constant supervision to maintain uniformity of product. Since in my process the tape is wrapped around the conductor with a uniform lap, the problem of centering a metallic core in its insulation is completely eliminated.

While, as just suggested, the tape may consist wholly of synthetic resin or other appropriate thermoplastic material, it is contemplated that the tape may contain inclusions of other materials, for instance, flock fiber or the like incorporated in the resin, or that the tape be a textile tape impregnated or coated with the thermoplastic. It is also to be understood that instead of overlapping the helical turns of tape, they may merely abut at their edges, providing the substance of the tape be sufficiently fluent when heated—the pressure integrating the adjacent turns to form a continuous sheath.

Still further, in the preparation of wire for the wiring of switchboards, where complicated electrical circuits require many different colors of insulation for ready identification, my novel process has a distinct advantage over the conventional tubing process. From the very nature of a tubing process it is obvious that an insulating coating of but one color can be applied to a given wire. This limits the color coding to the usual primary colors, or necessitates special chemical compounding of the synthetic resin in order to effect various shades of the primary colors. In my process the synthetic resin is applied to the wire in tape form prior to passing through devices according to my invention. When so wrapping a wire it is easy, for example, to use a red and a white tape, so lapped and wrapped around the conductor as to produce a barber-pole effect. The wire so wrapped is then passed through the apparatus of my invention, thus sealing the colored tapes into one homogeneous mass producing a synthetic resin insulated wire of two or more colors for ready identification on switchboard control circuits. This allows the manufacturer more latitude and provides a wider scope of circuit identification.

The last-mentioned process is illustrated in Fig. 6, where 110 are the helical layers of tape wrapped around conductor 111, prior to passing it through the apparatus of my invention; after having passed through the device, the insulation is homogenized as indicated at 112. Fig. 7 shows a finished conductor wrapped with two tapes of different color and then homogenized to produce the above-mentioned barber-pole effect.

Obviously, such method of covering, whereby different colors may be applied, is applicable not only to the insulation of wire, but also to other strand-like or elongate core elements.

While the above-described circuit for producing a high frequency heating field is desirable, the invention is of broader scope and is to be regarded as inclusive of any and all equivalent constructions such as fall within the scope of the appended claims.

I claim:

1. Apparatus for heat and mechanical treatment of an insulated electrical conductor, said apparatus comprising means for generating high frequency current, spaced pressure-applying means each having a passage for said conductor, each passage being of substantially uniform cross-sectional area from end to end, means operative to cause relative axial movement of the conductor and the pressure-applying means, means for rotating said pressure-applying means about the axis of said conductor, and means for supplying the said pressure-applying means, as the plates of a condenser, with high frequency energy from said generating means whereby a high frequency electrical field is set up between said pressure-applying means, the insulation of the conductor acting as a di-electric which is heated by the field while being compressed by the rotating pressure-applying means.

2. Apparatus for heat and mechanical treatment of strand-like material which includes an electrical insulating substance, said apparatus comprising means for generating high frequency current, a pair of pressure devices each having a passage for said material, each passage being of substantially uniform cross-sectional area from end to end, means for advancing the strand-like material through said passages, means for rotating said pressure devices about the axis of the material, and an equalizing condenser for each of said pressure devices, each condenser having a stationary plate connected to said generating means and a plate which is electrically connected to the corresponding pressure device whereby a high frequency electrical field is set up between said pressure devices which constitute in effect two condenser plates, the insulating substance included in said strand-like material acting as a di-electric which is heated by the field while being compressed by the rotating pressure devices.

3. Apparatus for use in consolidating thermoplastic covering for wire cables or the like, said apparatus comprising means forming a passage for the covered cable, said passage being of substantially uniform cross-sectional area from end to end, means operative to draw the cable axially through said passage, the elements which form the passage for the strand-like material being normally cold and constructed and arranged to exert radial compressive stress upon the cable covering, one, at least, of the passage-forming elements being designed and arranged to act as one plate of an electrical condenser, a second condenser plate spaced axially along the cable from the first, means operative to supply high frequency energy to said condenser plates whereby the cable covering is heated by the resultant field, and means operative to rotate the elements which form the passage as the strand-like material is drawn through the passage.

4. Apparatus of the class described comprising two spaced sets of presser devices each including relatively movable presser elements defining between them a passage for strand-like material, each passage being of substantially uniform cross-sectional area from end to end, means for drawing the strand-like material successively through the passages of said sets of presser devices, means operative to cause the elements of each set to press radially against the periphery of the strand-like material, means for rotating the presser elements of each set bodily about the axis of the strand-like material, and means constructed and arranged to establish a high frequency electrical field operative to heat the strand-like material as it is drawn through said passages.

5. Apparatus for use in consolidating thermoplastic covering of wire cables or the like, said apparatus including a pair of substantially like treating devices spaced longitudinally of the cable, and each, comprising a rotary sleeve having an axial passage for the cable, means for rotating the sleeve, an annulus fixed to the sleeve, a rigid pressure-applying shoe carried by the annulus, said shoe having an elongate cylindrically curved concave surface for engagement with the cable, and a resiliently yieldable presser shoe also carried by the annulus and operative by engagement with the cable to press the latter firmly against the rigid shoe, means for moving the cable axially through the sleeve and between the presser shoes, one at least of said shoes of one of said treating devices being electrically connected with one plate of an electrical condenser, and one at least of said shoes of the other treating device being electrically connected to the other plate of said condenser, and means operative to establish a high frequency field between said plates.

6. Apparatus for use in consolidating thermoplastic covering of wire cables or the like, said apparatus comprising a pair of substantially like treating devices spaced axially of the cable and each comprising a rotary sleeve having an axial passage for the cable, means for moving the cable axially through the sleeve, an annulus fixed to and coaxial with the sleeve, said annulus constituting one plate of a condenser, a rigid bracket supported by said annulus, the inner surface of said bracket having a concave substantially cylindrical curvature for engagement with the periphery of the cable, a second rigid bracket carried by the annulus and arranged substantially diametrically opposite to the first bracket, a pressure shoe disposed substantially diametrically opposite to the cylindrically curved surface of the first bracket, a spring urging said shoe toward the cable, means carried by the second-named bracket for positioning and variably tensioning the spring, the annulus constituting one plate of a condenser, there being a complemental condenser element spaced from the annulus, and means connecting said complemental condenser elements of the respective treating devices to the terminals of the secondary of a resonant circuit whose primary is supplied with high frequency current.

7. Apparatus for use in consolidating thermoplastic covering of wire cables or the like, said apparatus comprising a pair of substantially like treating devices spaced axially of the cable, each of said devices comprising a rotary sleeve having an axial passage for the cable, means for rotating the sleeve, means for moving the cable axially through the sleeve, an annulus coaxial with said sleeve, insulating means rigidly connecting said annulus to the sleeve, a pair of diametrically opposite spaced rigid brackets carried by the annulus, a pressure shoe removably secured to one of said brackets, said shoe having a concave surface for engagement with the periphery of the cable, a second pressure shoe arranged to engage the periphery of the cable at a point substantially diametrically opposite the first shoe, resilient means carried by the second bracket for supporting and urging said second shoe toward the cable, a fixed annulus spaced from and coaxial with the first-named annulus, said annuli constituting plates of a condenser, means connecting the fixed annulus of each of the respective treating devices to the opposite terminals respectively of the secondary of a resonant circuit, and means supplying high frequency current to the primary of said resonant circuit.

8. Method of heat-treating and consolidating strand-like material comprising a thermoplastic di-electric substance which comprises as steps generating a high frequency electrical current, continuously advancing the strand-like material in a longitudinal direction while holding its peripheral surface in compressive contact with two pairs of pressure-applying elements spaced longitudinally of the material, said elements also constituting condenser plates which are supplied with high frequency energy from the generating means whereby the di-electric substance is heated and caused to become adhesive by the field set up between said condenser elements and the strand material is radially compressed as it is passed between said elements thereby to consolidate the thermoplastic substance while it is warm and sticky.

9. Method of integrating constituent elements of strand-like material including a thermoplastic di-electric substance which comprises as steps providing a plurality of sets of pressure-applying elements, continuously moving the strand endwise from one set of pressure-applying elements to another, said elements also constituting condenser plates supplied with high frequency electrical energy whereby said di-electric is heated and caused to become plastic and adhesive by the high frequency field set up between said plates, and causing said pressure-applying elements to exert pressure substantially radially of the strand-like material while said thermoplastic substance is in the hot adhesive state thereby to consolidate the thermoplastic substance.

10. Method of integrating constituent elements of strand-like material including a thermoplastic adhesive di-electric substance which comprises as steps providing a pair of spaced condenser elements in a high frequency electrical field, continuously advancing the strand-like material endwise from one of said condenser elements to the other whereby the thermoplastic substance is heated and caused to become sticky throughout its entire radial thickness, causing the condenser elements to press radially against the strand-like material as the latter is moved endwise, and causing said condenser elements to rotate about the axis of the strand-like material while so applying pressure thereby to consolidate the thermoplastic substance while it is warm and sticky.

11. Method of insulating wire which comprises as steps helically wrapping the wire with a tape comprising a di-electric substance which is inherently capable of becoming adhesive when heated, and continuously advancing the wrapped wire while its peripheral surface is held in contact with a pair of condenser elements in a high frequency field whereby the di-electric is heated and caused to become sticky, and subjecting the wire with its wrapping while being heated to radial pressure thereby to coalesce and to consolidate the overlapping turns of tape while the di-electric is warm and sticky.

HOWARD M. WILKOFF.